Nov. 17, 1953 M. E. LAUTNER 2,659,831
SINGLE BEARING MOTOR CONSTRUCTION
Filed June 30, 1951
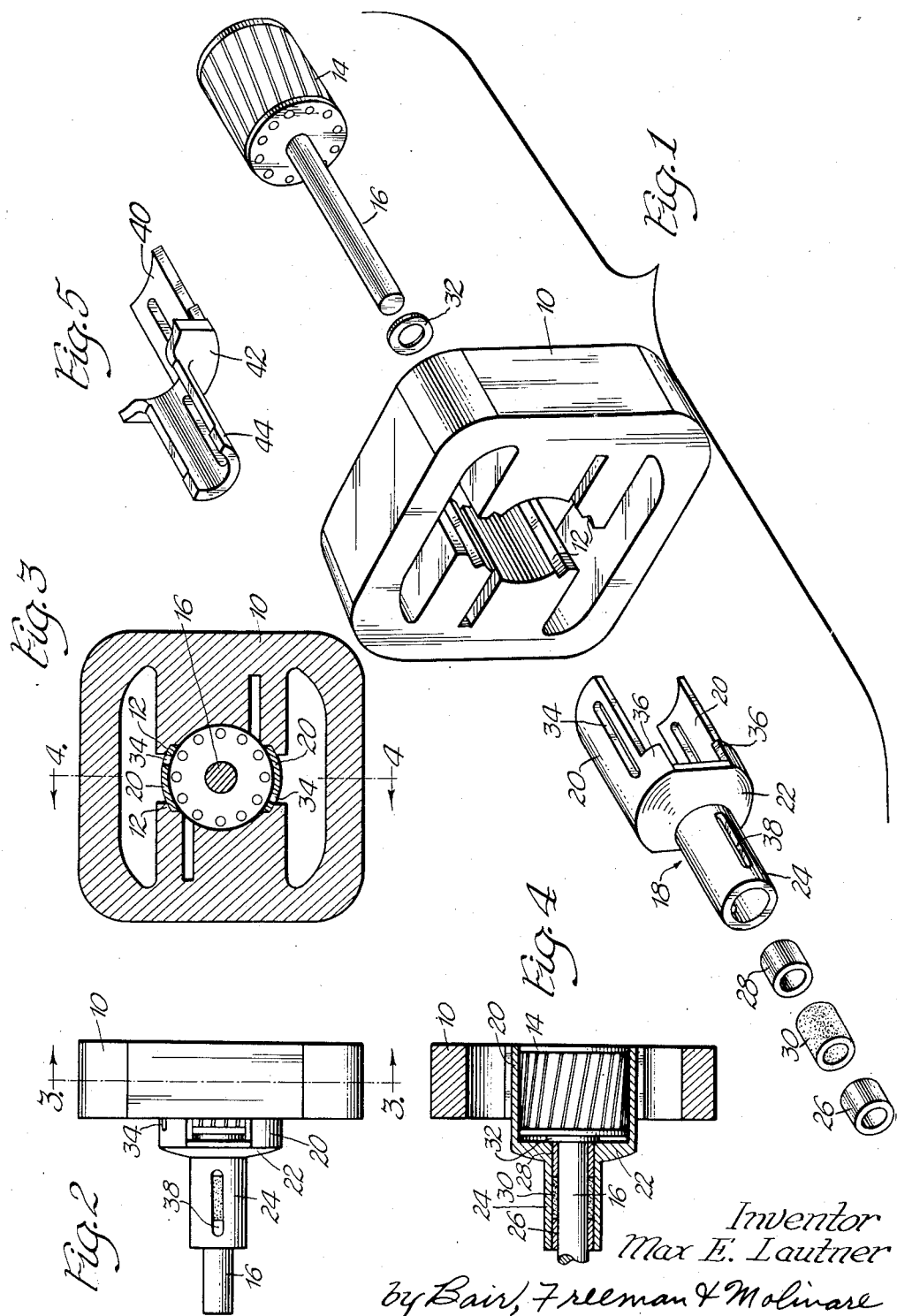
Inventor
Max E. Lautner
by Bair, Freeman & Molinare
Attys.

Patented Nov. 17, 1953

2,659,831

UNITED STATES PATENT OFFICE 2,659,831

SINGLE BEARING MOTOR CONSTRUCTION

Max E. Lautner, St. Louis, Mo., assignor to Knapp-Monarch Co., St. Louis, Mo., a corporation of Missouri Application June 30, 1951, Serial No. 234,508

10 Claims. (Cl. 310—90)

This invention relates to a single bearing motor construction, and more particularly to a single bearing construction for shaded pole motors.

In the design of shaded pole motors, the ideal construction, from a motor performance standpoint, includes the use of laminated pole tips which extend as far as possible around the circumference of the rotor. In view of production difficulties encountered when inserting the field coils, it is found that such a construction is not practical because the extended laminated pole tips interfere with the insertion of preassembled field coils. The practical solution results in the cutting down of the laminated pole tips so that the field coils may be inserted, and then the insertion of magnetic wedges between the opposite facing coil cores.

These magnetic wedges only partially obtain the ideal characteristics of the aforementioned laminated pole tips. The magnetic wedge, which is made from a magnetic material, gives an enlarged pole face area, and thus the high density flux passing through the pole has the opportunity to spread out at the pole face and cross the air gap into the rotor at a desired reduced flux density.

The shaded pole motor with magnetic wedges is a successful commercial device which can be used in installations which require low starting torque. This application is directed to a shaded pole motor with magnetic wedges and having but a single bearing for the rotor.

Single bearing motors which have been made are generally of two basic types. The first includes a die cast of fabricated bracket for supporting the rotor bearing. This bracket is attached to the front face of the field yoke by means of field studs. The second single bearing type motor is of the type where the bearing is integral with the front cover which is attached to the periphery of the field.

In both of these types of single bearing motors, there is a comparatively large obstruction over the face of the field, which results in considerable blocking off of air which may pass through the field. The chief method of cooling these motors is by means of air, but the bearing supports and brackets of existing motors usually restricts the internal ventilation of the motor.

To stress the importance of motor ventilation, the typical small shaded pole fan motor has an efficiency of 10% to 20%. This, of course, means that 80% to 90% of the input wattage is dissipated as heat from the motor. The maximum motor operating temperatures are established by code and, therefore, a motor and housing combination designed for maximum ventilation to carry off the dissipated heat requires a considerable amount of laminated iron and copper, whereby the heat may be transferred to the ambient air.

By removing the obstructions to internal ventilation of the motor, greater air cooling of the motor is obtained, and hence the amount of laminated iron and copper necessary in a well ventilated motor is considerably less than in an equivalent motor with poor ventilation.

Further difficulties which are encountered in existing single bearing motors include the problem of lining up the rotor bearings. It is often found upon assembling that the rotors bearings are out of line. Since most single bearing motors require a number of bolts and include a bracket which is bolted to the portions of the field, the error in the production of the various parts is sometimes cumulative, which results in a rather large error in lining up the bearing. Still another problem exists in that the bearing support is fixed axially with respect to the stator and does not permit of much rotor end play whereby axial adjustment of the rotor may be obtained.

Thus, one of the objects of this invention is to provide a single bearing construction for a motor rotor which permits of the greatest ventilation of the stator and consequent cooler operation of the motor.

Another object of this invention is to provide a prefabricated single bearing motor construction which eliminates bearing line-up problems and permits of simple end play adjustment.

A further object of this invention is to provide a single bearing construction for a shaded pole motor with magnetic wedges, wherein the single bearing housing is integral with or attached to the magnetic wedges, whereby upon insertion of the magnetic wedges the bearing is automatically lined up with the axis of the rotor, while still affording adjustability as to the depth of insertion of the magnetic wedges whereby the flux leakage therethrough is controlled.

Still another object of this invention is to provide a shaded pole motor with a single rotor bearing which is characterized by its simplicity and inexpensiveness of construction and ease of assembly.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which—

Figure 1 is an exploded isometric view of a shaded pole motor having a single rotor bearing construction;

Figure 2 is a side view of the assembled motor;

Figure 3 is a cross section view of the assembled motor and is taken on line 3—3 of Figure 2;

Figure 4 is a side cross section view of the assembled motor and is taken on line 4—4 of Figure 3;

Figure 5 is a modified form of the integral construction of the magnetic wedge and bearing sleeve.

Referring now to the drawings, there is shown in Figure 1 the field core 10 of a shaded pole motor. This field core 10 is provided with grooves or guideways 12 in the pole tips of the stator core. These grooves or guideways 12 extend parallel to the axis of rotation of the motor rotor.

The motor rotor is indicated at 14 and has a rotor shaft 16. The motor is provided with a single bearing support for the rotor 14. This single bearing support is generally indicated at 18 and is a single member which integrally combines a number of parts.

The single bearing support 18 includes a pair of magnetic wedges 20 which are adapted to be inserted in guideways 12. These magnetic wedges 20 are joined together at their base by an end plate 22. Extending from end plate 22 is a sleeve 24 within which the rotor bearing is positioned.

The rotor bearing consists of a pair of sleeve bearings 26 and 28 which are press fit into sleeve 24 and are separated by a felt oil reservoir 30. When assembled, the rotor shaft 16 extends through bearings 26 and 28. A washer 32 serves as a thrust bearing and is positioned between the rotor 14 and the end plate 22.

The magnetic wedges 20 are provided with slots 34 which are similar to slots which are used in conventional magnetic wedges. The length, width and position of these slots 34 are critically designed to control the leakage flux between the poles. Their relative proportions influence the wave form of the air gap flux.

The magnetic wedges 20 are also provided with shoulders 36 which act as a stop when inserting the magnetic wedges 20 into the guideways 12. These shoulders 36 butt against the face of the motor stator 12 and limit the insertion of the magnetic wedges 20 within the guideways 12. The area of these shoulders 36 in contact with the stator core poles is important since it increases the flux leakage path around the ends of the slots 34.

Since member 18 is an integral member, the end plate 22 and the sleeve 24 are also magnetic. This means that ordinarily there would be leakage flux through the sleeve 24. This would tend to increase the temperature in the bearing and, therefore, the sleeve 24 is provided with slots 38 which serve to limit the flux leakage through sleeve 24. The slots 38 also provide access to the felt oil reservoir 30 so that lubrication of the bearing may be maintained.

By attaching the bearing sleeve 24 to the magnetic wedges 20 there is provided two ways of axially adjusting the position of the rotor 14 with respect to the stator 10. Axial adjustment may be obtained by moving the magnetic wedges 20 and sleeve 24 in and out of guideways 12. Also, the rotor 14 and rotor shaft 16 are independently adjustable with respect to the magnetic wedges 20 and sleeve 24. This permits of greater end play adjustment of the rotor 14.

The bearing lineup problem is practically eliminated because sleeve 24 is made concentric with the magnetic wedges 20. There is then no problem of alignment between the rotor 14 and the magnetic wedges 20, and if the stator core 10 and guideways 12 are properly formed, then the alignment of the rotor 14 with the magnetic wedges 20 should be sufficient to align the entire motor.

In the alternate form shown in Figure 5, the single bearing support is formed by a plurality of parts. Each magnetic wedge 40 is formed integrally with a semicircular end plate portion 42 and with a semicylindrical sleeve 44. When two of these members are inserted in the stator core, they combine to form an equivalent of member 18 described and shown in Figure 1. A ring or collar (not shown) may be provided for clamping the semicylindrical portion of the sleeve 44 together.

Although the sleeve 24 has been described as an integral portion of member 18, it should be understood that sleeve 24 need not be magnetic and may be a separate member which is attached to end plate 22. If sleeve 24 is non-magnetic there is no need for the slots 38, because there is no leakage flux through the sleeve 24. It should also be understood that grease sealed bearings may be used in place of the simple sleeve bearings and felt oil reservoir shown in Figure 1.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An electric motor comprising a stator and a rotor, said stator including a plurality of spaced poles having guideways in the tips thereof, a single bearing support for the rotor comprising a plurality of magnetic members slidably inserted in said guideways in bridging relation between poles, an end plate attached to said members, and a bearing supported by said end plate and adapted to support said rotor.

2. A device as set forth in claim 1 wherein said magnetic members have slots cut therein, whereby the magnetic flux through said magnetic members is controlled.

3. A device as set forth in claim 2 wherein the magnetic members have shoulders thereon for engaging the stator poles to limit the insertion of said members into said guideways, and for providing additional flux leakage path around the ends of the slots in said members.

4. An electric motor comprising a stator and a rotor, said stator including a plurality of poles having guideways in the tips thereof, a single bearing support for the rotor comprising a plurality of magnetic members slidably inserted in said guideways in bridging relation between poles, an end plate integral with said magnetic members, a sleeve integral with and extending from said end plate, a bearing within said sleeve adapted to support said rotor, an oil reservoir in said sleeve, and slots in said sleeve for limiting the flux leakage through said sleeve and for providing access to the oil reesrvoir.

5. An electric motor comprising a stator and a rotor, said stator having a plurality of spaced poles having guideways in the tips thereof, a plurality of magnetic bridging members between pairs of poles slidably inserted in pairs of guideways in adjacent pole tips, and a single bearing for said rotor secured to the ends of said bridging members.

6. An electric motor comprising a stator and a rotor, said stator including a plurality of spaced poles having guideways in the tips thereof, the faces of the poles being arcuate to partially surround said rotor, a plurality of magnetic bridging members between pairs of poles slidably inserted in pairs of guideways in adjacent pole tips, said bridging members being arcuate and their inner arcuate surfaces being substantially a continuation of the arcuate faces of said poles, and a single bearing for said rotor secured to the ends of said bridging members.

7. An electric motor comprising a stator and a rotor, said stator including a plurality of spaced po'es having guideways in the tips thereof, and a single bearing support for the rotor comprising an integral member forming a plurality of magnetic bridging members, an end plate, and a sleeve, said magnetic bridging members being slidably inserted in pairs of guideways in adjacent pole tips, whereby said magnetic bridging members are positioned between pairs of poles, and said sleeve being adapted to support said rotor.

8. An electric motor comprising a stator and a rotor, said stator including a plurality of spaced poles having guideways in the tips thereof, and a single bearing support for the rotor comprising an integral member forming a plurality of magnetic bridging members, an end plate, and a sleeve, said magnetic bridging members being slidably inserted in pairs of guideways in adjacent pole tips, whereby said magnetic bridging members are positioned between pairs of poles, and said sleeve having slots therein for limiting the flux leakage through said sleeve.

9. An electric motor comprising a stator and a rotor, said stator including a plurality of spaced poles having guideways in the tips thereof, and a single bearing support for the rotor comprising a plurality of magnetic bridging members, an end plate attached to said magnetic bridging members, and a rotor supporting sleeve extending from said end plate, said magnetic bridging members being slidably inserted in pairs of guideways in adjacent pole tips, whereby magnetic bridging members are positioned between pairs of poles, each bridging member being formed integrally with a segmental portion of the end plate and a segmental portion of the sleeve, and means clamping the segmental portions of the sleeve together to form a rigid support for said rotor.

10. An electric motor comprising a stator and a rotor, said stator including a plurality of spaced poles having guideways in the tips thereof, a plurality of magnetic bridging members between pairs of poles slidably inserted in pairs of guideways in adjacent pole tips, an end plate attached to said magnetic bearing members, a bearing supported by said end plate and adapted to support said rotor thereby, and a thrust bearing between said end plate and said rotor.

MAX E. LAUTNER.

References Cited in the file of this patent

UNITED STATES PATENTS

| Number | Name | Date |
|---|---|---|
| 761,682 | Javaux et al. | June 7, 1904 |
| 2,264,272 | Blankenbuehler | Dec. 2, 1941 |
| 2,401,386 | Smellie | June 4, 1946 |
| 2,445,986 | Adamson | July 27, 1948 |

FOREIGN PATENTS

| Number | Country | Date |
|---|---|---|
| 123,088 | Australia | Dec. 10, 1945 |